May 31, 1932.  J. C. CROWLEY  1,860,888
AIR GAUGE EXTENSION
Filed Jan. 12, 1931
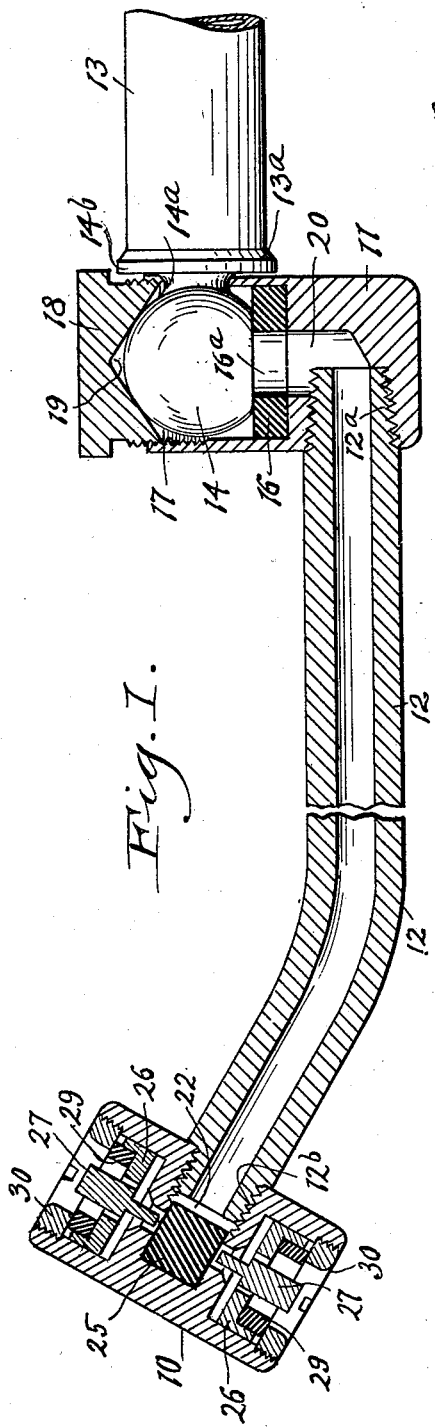
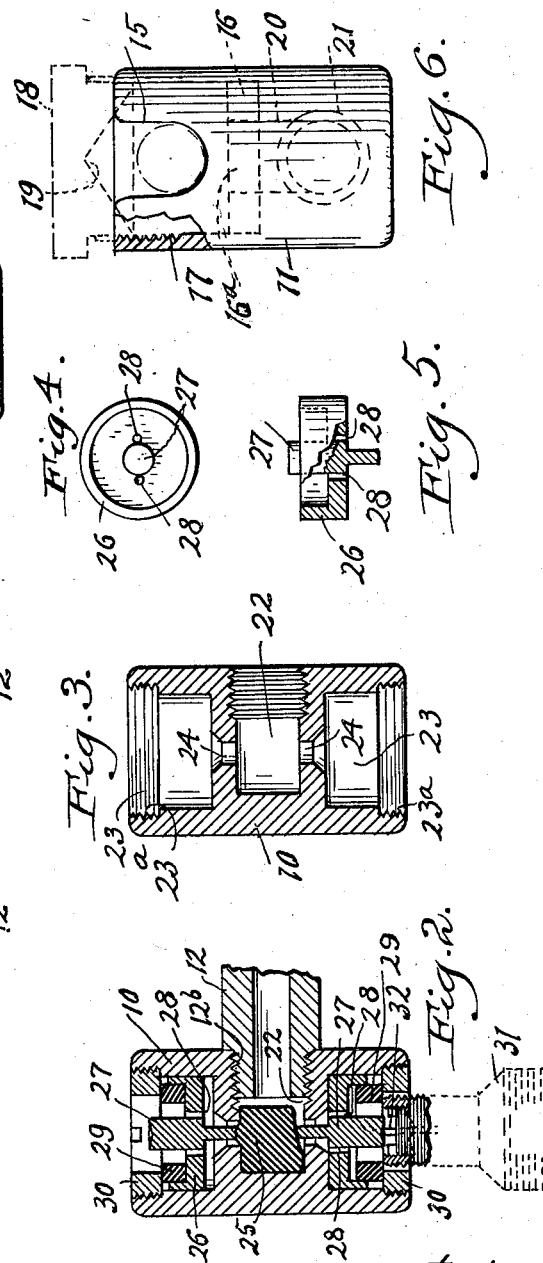
Inventor
John C. Crowley
Kwis, Hudson & Kent
attys.

Patented May 31, 1932

1,860,888

UNITED STATES PATENT OFFICE

JOHN C. CROWLEY, OF CLEVELAND HEIGHTS, OHIO, ASSIGNOR TO THE DILL MANUFACTURING COMPANY, OF CLEVELAND, OHIO, A CORPORATION OF OHIO

AIR GAUGE EXTENSION

Application filed January 12, 1931. Serial No. 508,165.

This invention relates to a device for connecting an air gauge or other member with the valve stem of a pneumatic tire.

An object of the invention is to provide a device for connecting an air gauge or other member to the valve stem of a pneumatic tire which may be easily and conveniently applied to the valve stem irrespective of the type of wheel upon which the tire is mounted and the location of the valve stem.

Additional objects and advantages will become apparent hereinafter.

An embodiment of the invention is illustrated in the accompanying drawings herein.

Figure 1 is a longitudinal sectional view of the device showing an air gauge attached thereto.

Fig. 2 is a fragmentary sectional view similar to Fig. 1 and showing one of the air chucks of the device applied to a valve stem.

Figs. 3, 4, 5 and 6 are detail figures of parts of the device.

It should be understood at the outset that although the device is shown herein in combination with an air gauge and acting as an extension device for such gauge this is only one use to which the air chuck portion of the device may be applied, since it is contemplated to provide air lines or air pumps with a chuck member of the character disclosed herein.

In certain types of motor vehicle wheels the valve stems of the pneumatic tires on the wheels are so arranged and formed as to be difficult of access and it is hard to apply the chuck of the relatively short conventional air gauge to the valve stem. There are other types of motor vehicle wheels such as dual wheels wherein the valve stems of the pneumatic tires are not only difficult to reach with the air chuck of an air line or of an air gauge, but also there being two valve stems on each wheel it is necessary to reverse the chuck after it has been connected to one tire in order to apply it to the valve stem of the other tire of the wheel. Furthermore, the angularity of the bends in the stems make it difficult to reach them with a chuck, and often the brake drum interferes with access to the stem of the inner wheel.

The device of the present invention includes an air chuck member which may be quickly and conveniently applied to the valve stems of pneumatic tires upon all types of motor vehicle wheels.

The device illustrated herein comprises an air chuck member 10, to which is connected an air conduit 12 which in the present instance connects the chuck member 10 with an air gauge attaching member 11, although as previously pointed out, the conduit 12 might be the supply line of a source of supply of pressure fluid. The conduit 12 may be of any suitable material but preferably it is formed of a rigid metal pipe or coupling and is curved adjacent to the air chuck member 10, whereby anyone using the device can hold the conduit 12 and apply the air chuck member 10 a valve stem, the curvature of the stem enabling the chuck to pass around the edge of the brake drum in the case of certain types of dual wheels.

A conventional form of air gauge is fragmentarily illustrated at 13 in Fig. 1; the spherical air chuck head 14 of the air gauge being shown secured to the air gauge attaching member 11.

The construction of the air gauge is well known and will not be described in detail herein since per se it forms no part of the present invention except in so far as the attaching member 11 cooperates therewith.

The air gauge attaching member 11 is shown for purposes of illustration as substantially cup-shaped, with the bottom portion of the cup relatively thick. The wall of the member 11 is provided with an opening 15 extending downwardly from the outer edge of the cup and is adapted to receive the neck of the air chuck head 14 of the air gauge (see Figs. 1 and 6).

It would be well to state at this time that the conventional air gauge 13 shown herein usually embodies the spherical air chuck head 14 connected by a neck portion $14^a$ to an enlarged annular flange $14^b$ which in turn carries a reduced threaded stud enabling the chuck head to be screwed into assembled relationship with the air gauge, a flexible gasket usually being clamped between the flange $14^b$ and a flared portion 13ª of the gauge casing to provide an air-tight connection. It is, of course, understood that the air chuck head 14 of the gauge is provided with a suitable air passage communicating with the gauge. The threaded stud, flexible gasket, and air passage of the gauge just above mentioned have not been illustrated herein since they are well known in the art and form no part of the present invention.

The spherical air chuck head 14 of the gauge lies within the cup member 11 with its valve stem engaging side bearings upon a flexible gasket 16 on the bottom of the cup and with its neck portion 14ª extending through the opening 15, the annular flange 14ᵇ engaging the outer side of the cup wall and extending slightly above the top edge thereof.

The cup member 11 is interiorly threaded as indicated at 17 in Figs. 1 and 6 so that a nut 18 may be screwed into the member 11 to clamp the spherical chuck head 14 of the gauge between it and the gasket 16, there being a recess 19 on the inner side of the nut 18 cooperating with the chuck head 14. This arrangement enables the gauge to be quickly, easily and effectively attached to and detached from the device.

The gasket 16 is provided with a central opening 16ª communicating with the air passage in the chuck head 14 of the gauge and with an air passage 20 in the member 11, this latter passage in turn connecting with a lateral passage 21 extending to the outer side of the member 11 and threaded to receive the threaded end 12ª of the conduit 12, or, of course, any other suitable coupling or fitting which might be mounted on the conduit 12.

Reference should again be made to the fact that it is fully within the purview of the present invention to have the end 12ª of the conduit connected to an air line or to an air pump in place of the gauge attaching member 11.

The other end of the conduit 12 may be threaded as indicated at 12ᵇ in Figs. 1 and 2 or it may be provided with a suitable threaded coupling or fitting, to enable the conduit 12 to be connected to the air chuck member 10.

The air chuck member 10 is illustrated herein as being cylindrical in shape, although of course it may have different configurations, and is provided substantially midway of its ends with a passage 22 extending diametrally inwardly of the member 10 from the circumference or periphery thereof to a point lying on the opposite side of the longitudinal center line through the member. This passage 22 is threaded adjacent the circumference of the member 10 to receive the threaded end 12ᵇ of the conduit or the threaded coupling above referred to.

The opposite ends of the member 10 are each provided with a counterbore 23 threaded at 23ª adjacent its outer end and in communication with the passage 22 by means of a passage 24 flared outwardly adjacent the counterbore for a purpose later to become clear. A packing gasket 25 is arranged in the passage 22 and normally covers the ports formed by the ends of the passages 24, such gasket terminating adjacent the inner end of the threads in the passage 22, see Figs. 1 and 2.

A cup-shaped member 26 is arranged in each counterbore 23 of the chuck member 10 with its open side toward the outer end of the counterbore. The members 26 each have a centrally disposed pin 27 either integrally formed thereon or fixedly secured thereto, projecting from both sides of the bottom of the member 26, the portion of the pin 27 that extends from the under side of the bottom of the member being of reduced diameter and projecting into the passage 24. The bottom of the cup-shaped member 26 is provided with a plurality of openings 28, see Figs. 4 and 5, such openings in the present disclosure being illustrated as two in number and arranged on diametrally opposite sides of the pin 27 but closely adjacent thereto. A packing gasket 29 is arranged within each of the cup-shaped members 26, this gasket moving with the member 26 which has a sliding fit in the counterbore 23. The member 26 is limited in its inward movement by the bottom of the counterbore 23 and is retained in the counterbore and limited in its outward movement by means of a ring nut 30 screwed into the counterbore upon the threads 23ª.

The conduit 12 having been connected to the air chuck member 10 and having its opposite end connected to an air line or to the air gauge illustrated herein the operation of the device will be as follows:

Either of the counterbores 23 in the member 10 can be applied to the end of a valve stem of a pneumatic tire in the manner shown in Fig. 2. When one of the counterbores 23 of the member 10 is applied to a valve stem 31, the end of the valve stem engages the gasket 29 carried by the member 26 in that counterbore and forms an air connection between the member 10 and the valve stem. This engagement of the gasket 29 by the end of the valve stem moves the member 26 with its pin 27 inwardly of the counterbore, the enlarged end of the pin 27 depressing the valve pin 32 of the valve insides within the valve stem to unseat the valve thereof, while the reduced end of the pin 27 passes through the passage 24 in the member 10 and raises the adjacent portion of the gasket 25 in the passage 22 (see Fig. 2). A continuous air passage is thus formed through the member 10 and the valve stem, placing the conduit 12 and the tire in communication with each other. It should be noted that when the member 26 is raised by its engagement with the valve stem that the openings 28 in the bottom of the member and adjacent the pin 27 lie within the circumference of the flared portion of the passage 24, whereby the passage 24 and the openings 28 form a continuous air passage.

Again referring to Fig. 2 of the drawings, it will be seen that when the pin 27 raises the gasket 25 the opposite side of the gasket will be raised or pushed in the same direction and thus distorted into the opposite passage 24 thereby more efficiently closing such passage and preventing any escape or leakage of air at this point.

Before the chuck member 10 is applied to a valve stem the gasket 25 in the passage 22 effectively closes the ports to the passages 24 so that if the conduit 12 is connected to an air line there will be no escape of air through the chuck member. When the air chuck member is being used with an air line to inflate the pneumatic tires of dual wheels, or when such member is being used, as illustrated herein, with an air gauge in taking readings of the air pressure within the tires, first one counterbore of the member 10 may be positioned over or upon the valve stem of one of the tires and then the other counterbore of the member 10 may be positioned over the valve stem of the other tire without reversing the chuck member and thereby greatly facilitating either the inflating or gauging operation.

It has already been stated that on certain types of wheels the valve stems are located in certain positions that are hard to reach, and that often the stems are bent to various angles, and it need hardly be pointed out that the device described herein will greatly facilitate the reaching of such valve stems with an air chuck for performing a gauging or inflating operation. It might also be well to observe that upon dual wheels the valve stems are often oppositely disposed which necessitates that a person applying an air chuck to such stems is required to push the chuck upon one of the stems in a direction away from his position and in applying the chuck to the other stem to reverse the same and pull it toward his position. A chuck member such as has been described herein greatly facilitates the application of the air chuck to stems such as have just been mentioned and particularly since the curved conduit 12 thereof facilitates getting around the brake drum to the stem of the inner wheel.

Although a preferred embodiment of the invention has been illustrated and described herein, it should be understood that the same is susceptible of various modifications and adaptations within the scope of the appended claims.

Having thus described my invention I claim:

1. A member having a plurality of air chucks associated therewith, a common passage associated with said chucks and communicating therewith, a single means in said passage normally sealing communication between the passage and chucks, and means associated with said chucks and arranged to displace said last named means when either chuck is applied to a valve stem to place the said chuck and said passage in communication.

2. A member having a pair of oppositely disposed air chucks and an air passage intermediate said chucks, a passage connecting each chuck with said first named passage, a single means in said first named passage normally closing the chuck passages, and means associated with each chuck whereby when one of the chucks is applied to a valve stem the first mentioned means will be displaced and the passage in said chuck will be in communication with the first mentioned passage while the passage of the other chuck will be more effectively closed.

3. A member having a counterbore in each of its opposite ends and a diametrally disposed passage open at one end and closed at its other end located intermediate the counterbores, passages connecting said counterbores with said first mentioned passage, outwardly facing cup-shaped members movably mounted in said counterbores and having centrally disposed oppositely projecting pins extending from their bottoms, the inner ends of said pins extending into the passages connecting the counterbores with the first mentioned passage, each of said cup-shaped members having a packing disposed therein and being provided with an opening in its bottom, mean for retaining each cup-shaped member in the counterbore, and a gasket in the first mentioned passage and normally closing the passages to the counterbores.

4. In a device of the character described, an air gauge attaching means comprising a substantially cup-shaped member having an opening in its wall and being interiorly threaded adjacent its outer edge, a gasket within the said member having a central opening, said member having an angularly disposed passage communicating with the opening in the gasket and extending to the circumference of the member, and a nut adapted to be screwed into the open end of said member and having a recessed under side whereby the chuck head of an air gauge may be clamped between said nut and said gasket.

5. A member having a plurality of air chucks associated therewith, a common passage associated with said chucks and communicating therewith, a packing gasket in said passage and normally sealing communication between the passage and said chucks, and means associated with said chucks and arranged to displace said gasket when either chuck is applied to a valve stem to place the said chuck and said passage in communication.

6. A member having a pair of oppositely disposed air chucks and an air passage intermediate said chucks, passages connecting each chuck with said first named passage, a packing gasket in said first named passage and normally closing the chuck passages and means associated with each chuck whereby when one of the chucks is applied to a valve stem the gasket will be displaced and the passage in said chuck will be in communication with the first mentioned passage while the passage in the other chuck will be more effectively closed.

7. A member having a counterbore in each of its opposite ends and a diametrally disposed passage open at one end and closed at its other end located intermediate the counterbores, passages connecting said counterbores with said first mentioned passage, outwardly facing cup-shaped members movable mounted in said counterbores and having centrally disposed oppositely projecting pins extending from their bottoms, the inner ends of said pins extending into the passages connecting the counterbores with the first mentioned passage, each of said cup-shaped members having a packing disposed therein and being provided with an opening in its bottom, means for retaining each cup-shaped member in its respective counterbore, and means in the first mentioned passage normally closing the passages to the counterbores.

In testimony whereof, I hereunto affix my signature.

JOHN C. CROWLEY.